S. G. WILCOX,

Assignor, by mesne assignments, to A. H. WHITING.

Metal-Worker's Tool.

No. 9,064. Reissued Feb. 3, 1880.

Witnesses.
A. Ruppert,
James H. Lange.

Spencer G. Wilcox.
Inventor.
per C. S. Bundy
Attorney

N. PETERS, PHOTO-LITHOGRAPHER, WASHINGTON, D. C.

UNITED STATES PATENT OFFICE.

SPENCER G. WILCOX, OF WEEDSPORT, NEW YORK, ASSIGNOR, BY MESNE ASSIGNMENT, TO A. H. WHITING, OF HARRISBURG, PA.

METAL-WORKER'S TOOL.

SPECIFICATION forming part of Reissued Letters Patent No. 9,064, dated February 3, 1880.

Original No. 211,608, dated January 21, 1879. Application for Reissue filed August 13, 1879.

*To all whom it may concern:*

Be it known that I, SPENCER G. WILCOX, of the town of Brutus and village and post-office of Weedsport, in the county of Cayuga and State of New York, have invented certain new and useful Improvements in Metal-Workers' Tools; and I do hereby declare that the following is a full, clear, and exact description of the invention, that will enable others skilled in the art to which it appertains to make and use the same, reference being had to the accompanying drawings, and to the letters of reference marked thereon, which form a part of this specification.

This invention relates to an improved implement for metal-workers, of that class in which a reciprocating tool operated by suitable levers is employed; and it has for its object to dispense with the rack and cogged mechanism heretofore employed for transmitting motion from the levers to the reciprocating tool, to increase the leverage, and to enable the levers to act directly upon the tool without intermediate mechanism, and with a minimum loss of power by friction.

To this end the invention consists in the employment, in connection with a stationary tool, of a reciprocating tool connected to the levers by slotted elbows and a pin, and in certain other details of construction, as more fully hereinafter set forth.

Figure 1:
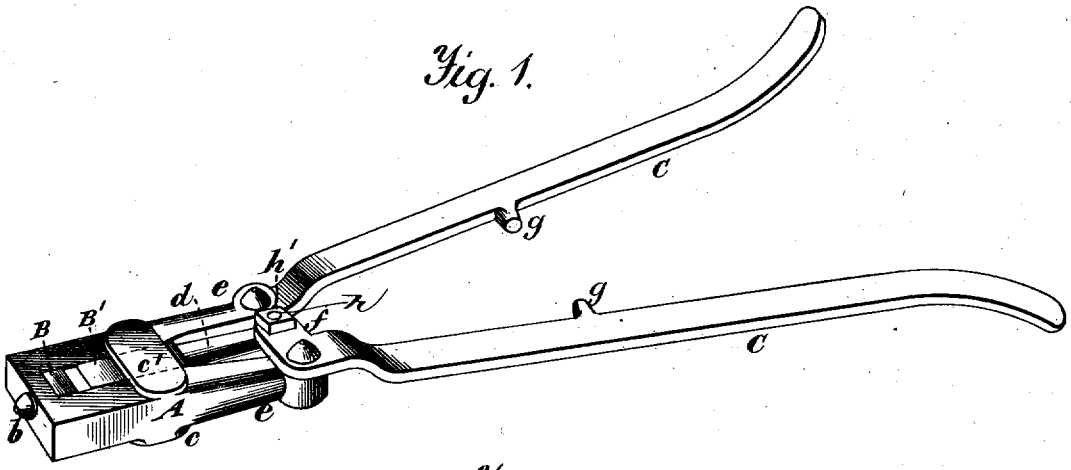
Figure 2:
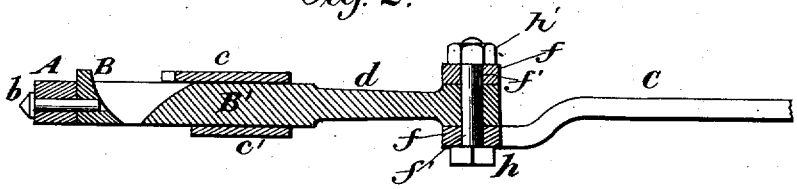
Figure 3:
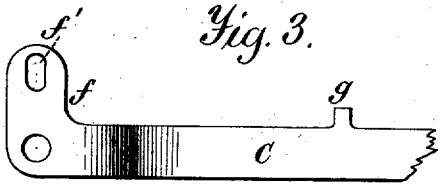
Figure 4:
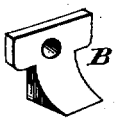
Figure 5:
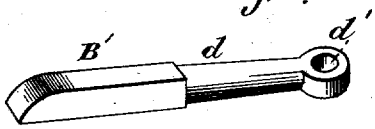

In the drawings, Figure 1 represents a perspective view of my improved implement; Fig. 2, a longitudinal section with one of the handles in side elevation and partly broken away; and Figs. 3, 4, and 5, detail views of the same.

Referring to the drawings, A represents an open head or frame, inserted laterally in the upper end of which is the stationary tool or die B, with one side projecting beyond the slot or opening in the head, so as to limit its insertion into said head. It is held in place by means of a headed pin, *b*, inserted through the upper end of said head A, and entering and operating in an aperture or socket made in said head, as clearly shown in Fig. 2 of drawings.

The letter B′ indicates a reciprocating or sliding tool confined in the head or frame A by means of the side pieces or plates, *c c′*, one placed slightly in advance of the other, and each fastened or secured to the frame or head A.

This tool B′ is extended inwardly or provided with an arm, *d*, having an eye, *d′*.

The letters C C indicate the levers or handles, which are pivoted at their upper ends to the lower ends of the arms *e e* of the head or frame A by headed bolts and nuts, as clearly shown in Fig. 1. This pivotal point is the fulcrum of the levers. These levers are provided at their said upper ends with right-angled arms *f f*, one located on one side of the movable tool B′ and the other upon the opposite side thereof, the levers being curved or bent near their upper ends, as shown in Fig. 1, so as to cause their lower portions to stand parallel with each other for convenience in handling.

The arms or elbows *f* are provided with slots *f′*, which receive a headed bolt, *h*, passing through the eye *d′* in the lower end of the movable tool B′, and secured by a nut, *h′*, thus connecting the movable tool to the levers C C. These slots *f′* allow the necessary play as the tool is put in operation.

By this construction and arrangement of the parts it will be observed that the action of the levers is brought directly upon the movable tool, that a maximum of power with a minimum of friction is obtained, and that the employment of rack and cogged mechanism, as heretofore employed, is obviated, simplifying the complete implement and rendering it more substantial.

Having thus fully described my invention, what I claim, and desire to secure by Letters Patent of the United States, is—

1. The combination of a reciprocating tool with elbow-levers having fixed fulcrums and slotted connections, substantially as and for the purposes specified.

2. The combination, with a stationary tool, of a movable tool with its lower end directly connected to levers by slotted elbows forming part of said levers, substantially as specified, for the purpose set forth.

3. The combination, with an open head or frame and stationary detachable tool, of the movable tool and the slotted elbow-levers loosely pivoted to said movable tool, as specified.

4. The bent levers C C, fulcrumed as shown, and having arms *f f*, provided with slots *f′ f′*, in combination with a movable tool, B′, having extension *d*, provided with eye *d′* and connecting-bolt *h h′*, as herein specified.

5. The elbow-levers C C *f f f′ f′* and movable tool B′ *d d′*, in combination with the open head A, stationary tool B, and confining-plates *c c′*, as and for the purposes specified.

In testimony that I claim the foregoing I have hereunto set my hand this 5th day of August, 1879.

SPENCER G. WILCOX.

Witnesses:
WM. HENDERSON,
CHAS. M. HENDERSON.